United States Patent [19]

Dupuis

[11] 4,163,487
[45] Aug. 7, 1979

[54] CONTACT PIN FEEDING AND ORIENTING APPARATUS

[75] Inventor: Jean M. Dupuis, Ottawa, Canada

[73] Assignee: Northern Telecom Limited, Montreal, Canada

[21] Appl. No.: 919,663

[22] Filed: Jun. 27, 1978

[51] Int. Cl.² ............................................. B65G 47/24
[52] U.S. Cl. ..................................... 198/383; 193/47; 198/399
[58] Field of Search ............... 198/383, 398, 399, 400; 193/44, 47; 221/172

[56] References Cited

U.S. PATENT DOCUMENTS

| 1,658,428 | 2/1928 | Charles | 193/47 X |
| 2,309,471 | 1/1943 | Moore | 193/47 X |
| 2,334,004 | 11/1943 | Herzog | 198/400 X |

Primary Examiner—James L. Rowland
Attorney, Agent, or Firm—Sidney T. Jelly

[57] ABSTRACT

Contact pins, of square cross-section and having a swaged portion nearer one end, are oriented so as to be fed to a magazine or other device with the ends nearer the swage portion all in the same direction. The pins move along channel-shaped grooves, over slots in the grooves. The slots have parts of different widths such that, the longer end of a pin falls down first, followed by the swaged portion end. In one orientation, with the swaged portion leading, the swaged portion holds the pin up over the slot until the longer end can fall down, while in an alternative orientation, with the swaged portion lagging, the longer end falls through as the pin moves over the slot.

10 Claims, 8 Drawing Figures

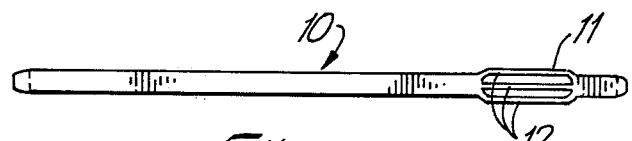
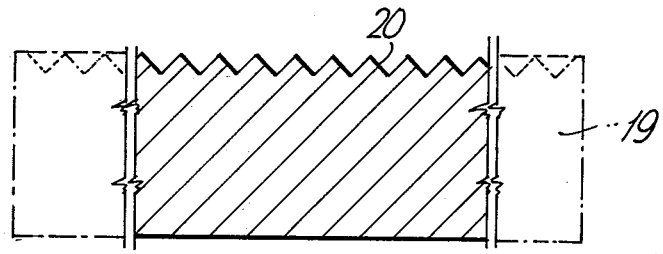
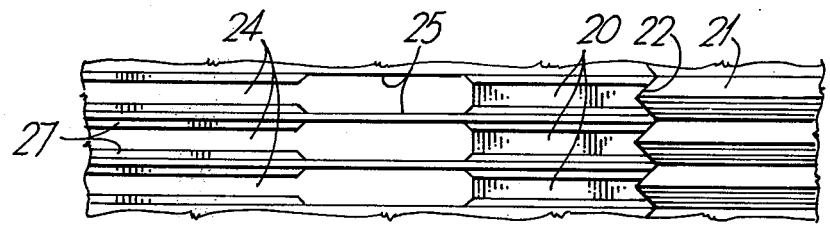
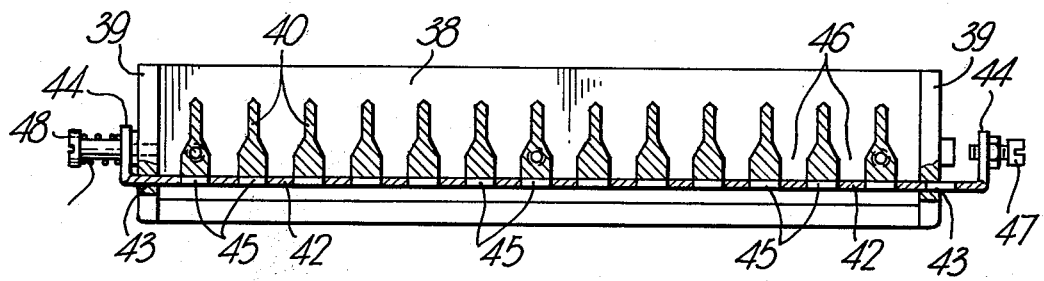
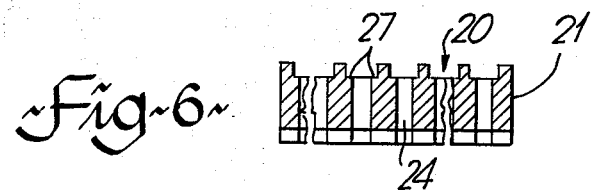

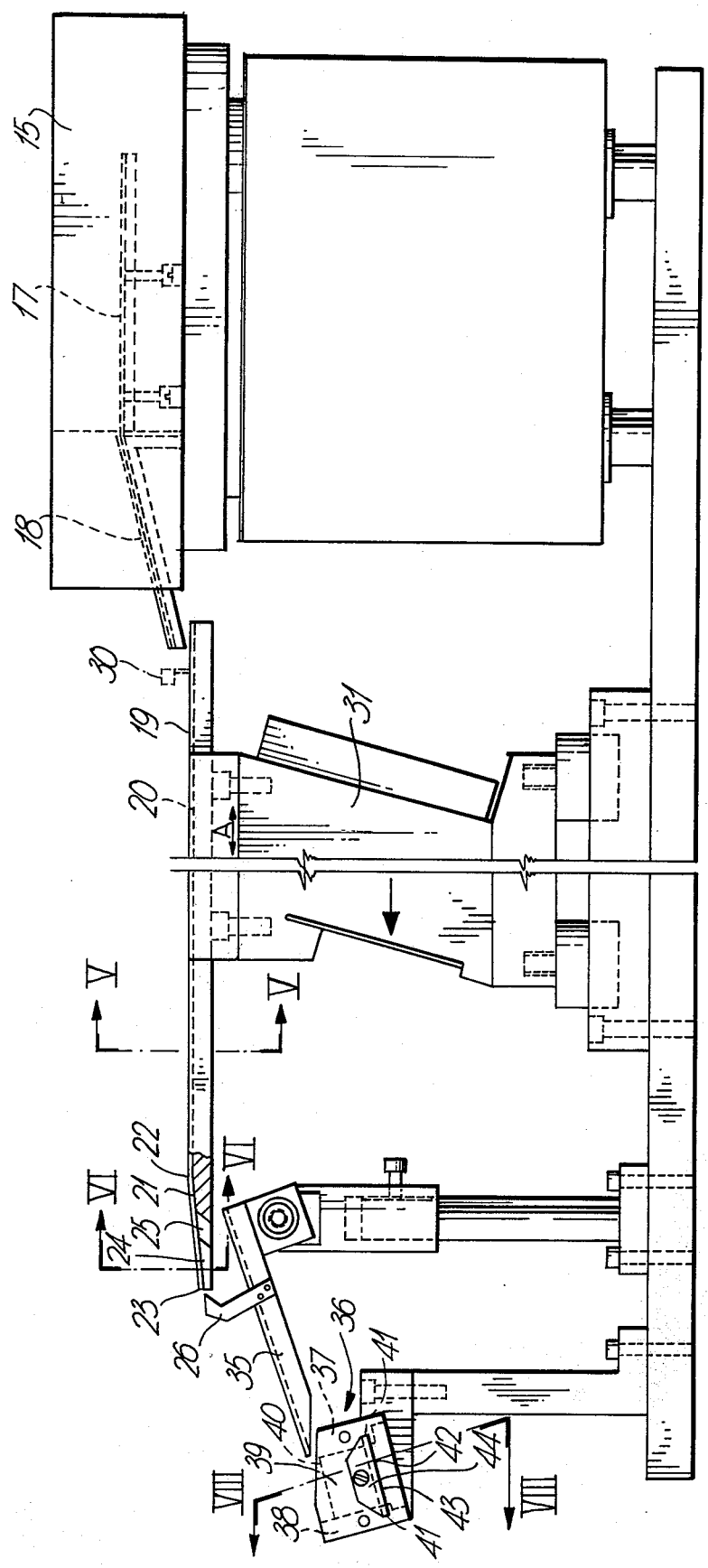

CONTACT PIN FEEDING AND ORIENTING APPARATUS

This invention relates to a contact pin feeding and orienting apparatus, and is particularly concerned with an apparatus for non-symmetrical pins having a top end and a bottom end, to ensure that the pins are finally oriented with the same ends extending in the same direction.

In many electrical and electronic systems, for example telecommunications systems and the like, contact pins are inserted, in large numbers, in printed circuit boards and other members. While insertion can be by hand, this is costly and time consuming. It has been proposed, as described in co-pending application Ser. No. 919,666 filed June 27, 1978, to preload pins into a loading fixture which is then positioned in a press and a multiplicity of pins inserted at one stroke of the press. However, the pins are manufactured from coils of wire, and are swaged, or deformed, at a position intermediate their ends, to provide a portion having an enlarged dimension which will be a force fit in the board or other member. Some pins are symmetrical about the swage and therefore it is not important which way they are fed to the loading machine for insertion into the loading fixture. However, some pins are swaged closer to one end and it is then important that the pins are fed with the correct orientation. The present invention is concerned with an apparatus which will finally feed the pins to a magazine or storage member in the same orientation, independently of the direction in which the pins originally feed to the feed apparatus. The pins are supplied to the machine in bulk in haphazard arrangement and fed from a hopper by means of a rotary vibrator feeder or similar.

In the apparatus of the invention, pins having a square cross-section and a swaged portion towards a top end, the swaged portion creating protruberances extending from the sides of the pin, are fed along channel shaped grooves at the delivery end of a feed member. Slots extend down through the feed member from the grooves, a slot to each groove. Each slot has a first, narrow portion extending from the end face and a wider second portion, the length of the wider portion shorter than the length of the swaged portion of a pin. A support edge is positioned a short distance from the end surface of the feed member, this distance less than that from the end surface of the pin at the one end to the end of the swaged portion remote from the top end. A pin fed top end first continues over the wide portion of the slot until the top end rests on the support edge, when the other end of the pin falls down through the slot, the pin falling with the top end uppermost. A pin fed top end last tilts down through the slot, the swaged portion falling through the wider portion of the slot, the top end again uppermost.

The invention will be readily understood by the following description of one embodiment, by way of example, in conjunction with the accompanying drawings, in which:

FIGS. 1 and 2 are side view and end views of a pin;

FIG. 4 is a side view of the apparatus for FIG. 3;

FIGS. 5 and 6 are sectioned views on lines V—V and VI—VI of FIG. 4;

FIG. 7 is a top view of part of the end of the feed members in FIG. 4;

FIG. 8 is a cross-section on the line VIII—VIII of FIG. 4.

Figure 3:
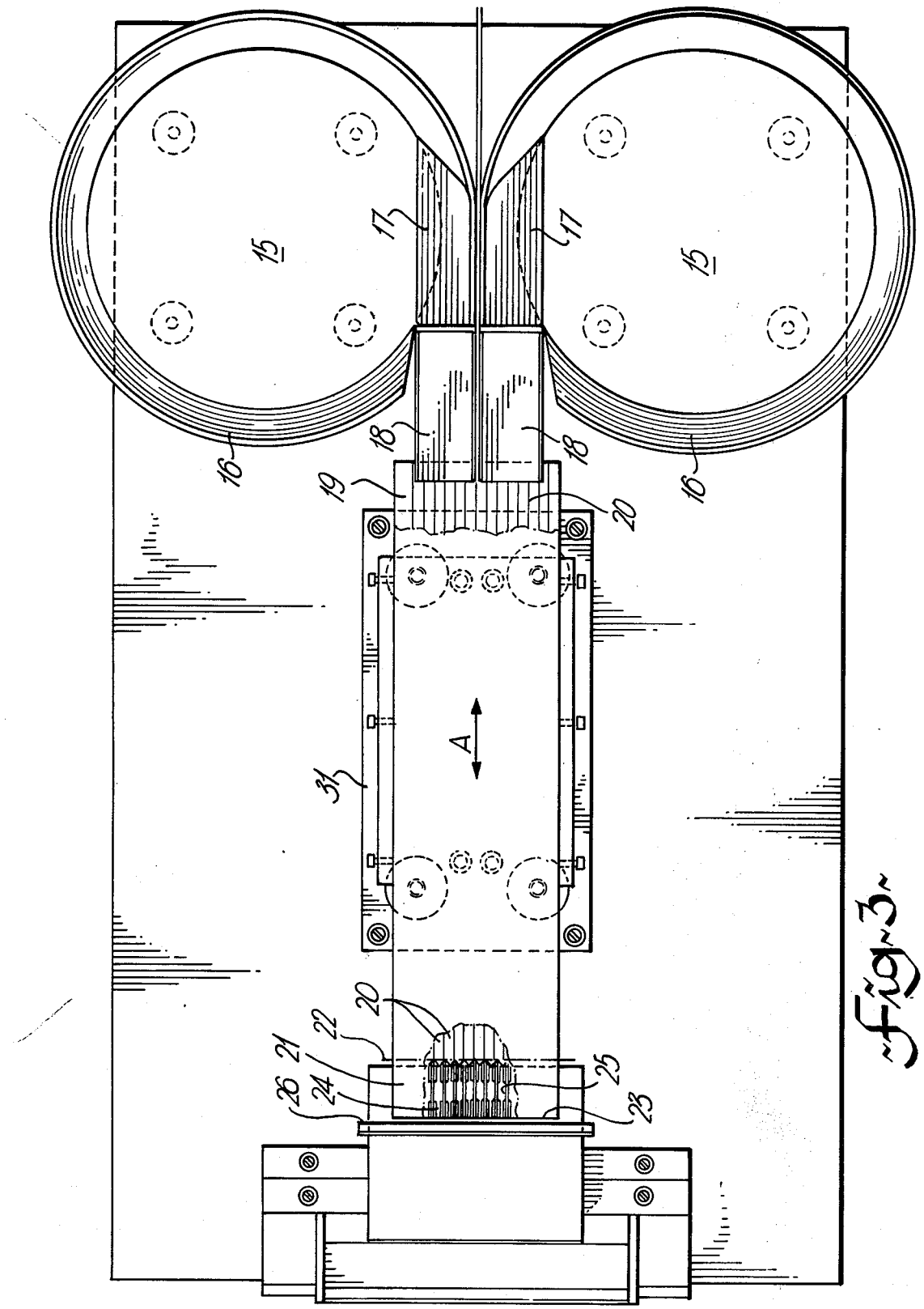
FIG. 3 is a plan view of an apparatus for feeding and orienting pins.

One form of pin is illustrated in FIGS. 1 and 2, to an enlarged scale. In a particular example a pin 10 is about 0.8" in length, is of square cross-section wire 0.026"×0.026" and is swaged near one end, conveniently considered as a top end at 11, to give a dimension of 0.031"×0.031" across swages 12. That is, in the particular example, the pin is 0.005" larger across the swages than at the unswaged portion. It is this difference in dimension which is used to orient the pins.

It should be appreciated that the center of gravity of the pin is exactly mid-way along its length, as the swaging does not remove or add material, just displaces it laterally, i.e. normal to the pin axis. Thus the center of gravity is not affected. Therefore, many of the more conventional orienting methods cannot be used as these rely on the non-symmetry of the item about the center of gravity to either sort, or orientate.

Illustrated in FIGS. 3 and 4 is one form of apparatus, in which pins, supplied in bulk, are fed to slides down which they move and from which they fall, the pins being arranged to fall at all times with the swaged end to what can be considered to be the rear. If the pins feed with the swage towards the rear, then the pins fall through into a magazine directly. If fed with the swage toward the front, the pins travel a short distance further, supported by the swages and then the pin falls so as to turn over, to position the swage towards the rear.

In the apparatus as illustrated in FIGS. 3 and 4, the pins, supplied in bulk, are deposited into the hoppers of two vibrator feeders 15, of known type. The vibrators have a rotary vibration and the pins travel up inclined ramps 16 and on to grooved transfer members 17. From transfer members 17 the pins proceed down grooved ramps 18 and drop onto the input end of a grooved feed member 19. The grooved feed member 19 is vibrated linearly, as indicated by arrow A.

The grooves 20 in the transfer members 17, ramps 18 and feed member 19 are Vee shaped grooves having an angle at the base of the grooves of 90°, with the sides of the grooves at 45° to a plane normal to the feeder surface, that is the grooves are symmetrical about a vertical axis. This provides easier feeding. If grooves having a flat base and vertical sides were used it would be more difficult to move the pins, particularly as they would be in contact with the grooves on the base surface and on the side surfaces.

The grooves 20 in the feed member 17 continue at the 45° orientation for the major part of the length of the member 19, from the input end in the present instance for the length of the member 19 for which it extends substantially horizontally. The output end of member 19 is sloped downward, at 21. At the transition point 22, from horizontal to sloped or inclined condition, the grooves 20 also change, being channel shaped with flat bottom surfaces and vertical sides. Also, the part 21 is slotted from the end surface 23 towards the transition point 22, a slot 24 in each groove. The slots are each of a predetermined width for the first section, from the end surface 23 up to a widened portion 25 at the end of each slot. The form of the grooves 20, slots 22 and widened portions 25 is seen more readily in FIGS. 5, 6 and 7, FIGS. 5 and 6 being cross-sections at two different positions along the grooves 20, and FIG. 7 being a top view of part of the end part 21, all to a larger scale for clarity. Positioned a short distance from the end surface 23 is a support edge member 26, illustrated in FIGS. 3 and 4.

The orientation of the grooves 20, and the cross-section, for the major part of the feed member 19 is seen in FIG. 5, that is up to the transition position 22. The orientation of the grooves for the end part 21, and the slots 24, is seen in FIG. 6. The slots 24 are slightly narrower than the grooves 20 and a narrow ledge 27 is left on each side of each slot 24, at the bottom of each groove 20. This is also illustrated in FIG. 7, the transition of the grooves 20 from a Vee form to a channel form seen at 22 and the slots 24 with widened portions 25, and also the ledges 27. The length of the wide portions 25 is less than the length of the swaged portions 11 of the pins. The distance from the end surface 23 to the support edge of the members 26 is less than the distance from the end of the pins adjacent to the swage, to the end of the swaged portion remote from the pin end surfaces.

In operation, the pins are loaded in bulk into the vibrator feeders 15 where the pins move up the ramps 16 and move onto the transfer members 17. The pins then move down the ramps 18 and fall onto the feed members 19. A transverse member, indicated in dotted outline at 30, can be provided, extending over the feed member 19 adjacent to the end of the ramps 18 to ensure that only a single pin at a time passes along each groove 20 and that one pin doesn't ride on top of another. The pins move along the grooves 20 in the feed member 19 under the vibrating action of a vibrator 31 on which the feed member 19 is mounted. At this time the pins are in the Vee form sections of the grooves 20. At the transition position 22 the pins rotate through 45° and travel in the channel form section of the grooves 20.

On rotation of the pins, the swages 12 rest on and slide on, the ledges 27. If a pin is so positioned on a groove that the swaged end, that is the top end, is forward, then as the pin moves along the groove 20 in the part 19, the swages 12 will bridge the widened portion 25 as the length of this portion 25 is less than the length of the swaged portion 11 on the pins. The pin is thus carried over the portion 25 and continues down the grooves 20. The top end of the pin moves over the end surface 23 and on to the edge 26. As soon as the swaged portion of the pin moves off the part 21 on to the edge, the pin rotates with the end of the pin falling down through the slots 24 and the swaged portion eventually passing down between the end surface 23 and the edge 26. The pin falls down to an inclined member 35 which has a grooved top surface similar to the main part of the feed member 19, that is with grooves of a Vee formation. In this rotating and dropping the pin has been turned end-to-end and the swaged portion 11 is now to the rear. The pin proceeds down the member 35 and falls into one of the compartments of a magazine 36. The member 35 is also vibrated by the action of the vibrator 31, as is the magazine 36.

If however a pin is so positioned on a groove 20 that the swaged portion 11 is at the rear, then as the pin rotates at the transition section 22, while the swage 12 will again engage with the ledges 27, as the pin passes over the widened portion 25, the forward end will start to tilt and fall down through the slot 24 as the swaged portion moves over the widened portion 25. The swaged portion of the pin falls down through the widened portion 25 of the slot 24 and falls on to the member 35. In this instance however the pin is not turned end-to-end and is still with the swaged portion to the rear.

The magazine 36 is seen end-on in FIG. 4 and in longitudinal cross-section in FIG. 8. Generally, the magazine comprises back and front members 37 and 38, and end members 39. Extending between the back and front are partitions 40, the partitions extending down from near the top to a position spaced from the bottom of the magazine. Extending between the front and back, and longitudinally slidably supported in grooves 41 in the front and back, is a base member 42. Base member 42 extends through slots 43 in the end members 39, and has upturned ends 44. The base member is in contact with the bottom surfaces of the partitions 40 and has transverse apertures 45. The width and spacing of the apertures 45 is such that in one longitudinal position of the base member the apertures are covered by the bottom of the portions, while in the other longitudinal position of the base member the apertures are aligned with the spaces 46 between the partitions. Screws 47 and 48 are provided in the ends 44 to provide for positional control of the sliding of the base member 42, one screw 47 being threaded into an end 44, the other screw, 48, passing through a clearance hole in the other end 44 and screwing into an end member 39. A compression spring 49 is positioned on screw 48, between the head of the screw and the related end 44 to urge the base member to a position where the apertures 45 are beneath the partitions 40. When the magazine 36 is full of pins it can be removed and positioned over a further apparatus, for example a loading fixture apparatus, and pressure on the end of the end of the base member remote from the spring 49, will cause the base member to slide longitudinally, moving the apertures 45 into alignment with spaces 46 and allowing the pins to fall, for example into a magazine or hopper on the other apparatus.

As an example only, various dimensions of the slots 24, widened portions 25 and other related details are as follows, for a pin of 0.025" square wire. The dimension over the swages 12 is 0.032", the width of the slots 24 is 0.027" and the width of the grooves, between side walls, for the channel shaped portions of the grooves in part 21 is 0.032". The widened parts 25, of the slots 24, are 0.0325" wide and these widened parts are approximately ⅛" long, with the swages 12 extending for somewhat more than this. The angle of the end surfaces 50 of the widened portions 25 is relatively important and is of the order of 30°–40°, 40° being preferred.

What is claimed is:

1. Apparatus for feeding and orienting contact pins, said pins having a square cross-section, a top end and a bottom end and including a swaged portion nearer said top end, said swaged portion including protrusions extending normal to each flat surface of the pin, the apparatus comprising:

a grooved feed member including a delivery end, the grooves at said delivery end each being of channel-shaped cross-section and having a base surface and substantially vertical side surfaces spaced apart a distance to permit said swaged portions to pass therebetween, a slot extending down through the feed members from the base surface of each groove, said slots extending from an end surface at said delivery end and each slot including a first portion extending from said end surface and a second portion extending from said first portion, said second portion having a length less than the length of the swaged portion of a pin and a width to pass said swaged portion, said first portion of a width narrower than said swaged portion of a pin and wider than said square cross-section of a pin to provide a ledge on each side of the first portion of the slot;

a support edge spaced from said end surface a distance less than the distance from a top end surface of a pin to an end of the swaged portion remote from said top end surface; and means for feeding pins along the grooves of the feed member to said delivery end;

whereby when a pin is fed along a groove with its top end forward, the swaged portion is supported across said second portion of said slot to said first portion, said protrusions moving on said ledges, said top end feeding on to said support edge before said swaged portion leaves said end surface, continued feed movement moving said swaged portion off said end surface and said bottom end of said pin rotating down through said slot, said swaged portion rotating on said support edge, the bottom end falling first and followed by said top end, and whereby when a pin is fed along a groove with its bottom end forward, the bottom end falls down through the slot the swaged portion following through the second portion of the slot, so that in either feed orientation, a pin falls with its bottom end first.

2. Apparatus as claimed in claim 1, said grooved feed member having a feed end and said delivery end, said feed end contiguous with said delivery end, said grooves at said feed end of Vee cross-section, and each groove having two inclined side surfaces extending at approximately 45° to a top surface of said feed member.

3. Apparatus as claimed in claim 1, each of said slots having an end surface, remote from said first portion, said end surface of said second portion inclined downwardly and toward said end surface at said delivery end.

4. Apparatus as claimed in claim 3, said end surface of said slot inclined at an angle between about 30° and about 40° from the vertical.

5. Apparatus as claimed in claim 1, including a grooved inclined member below said slots, said pins dropping bottom end first on said inclined member and sliding forward bottom end first.

6. Apparatus as claimed in claim 5, including a magazine positioned beneath an output end of said inclined member, said magazine including a plurality of partitions, said pins falling into spaces between said partitions.

7. Apparatus as claimed in claim 6, including release means in a bottom surface of said magazine for releasing said pins from said magazine.

8. Apparatus as claimed in claim 1, said means for feeding pins along the feed member comprising a linear vibrator for vibrating said feed member along an axis parallel to said grooves.

9. Apparatus as claimed in claim 2, including means for feeding pins singly to each groove at said feed end of said feed member.

10. Apparatus as claimed in claim 9, said means for feeding pins including at least one rotary vibrator feeder, and a grooved transfer member extending from the outlet of the vibrator feeder over the feed end of said feed member.

* * * * *